United States Patent [19]

Terenzi

[11] Patent Number: 5,794,560
[45] Date of Patent: Aug. 18, 1998

[54] AUTOMATIC DOG AND CAT FEEDER

[76] Inventor: Bruno Terenzi, 1341 Claremont Dr., San Bruno, Calif. 94066

[21] Appl. No.: 748,776
[22] Filed: Nov. 14, 1996
[51] Int. Cl.⁶ ................................................ A01K 5/02
[52] U.S. Cl. ............................................... 119/51.11
[58] Field of Search ................................... 119/51.11

[56] References Cited

U.S. PATENT DOCUMENTS

| | | | |
|---|---|---|---|
| 3,587,530 | 6/1971 | Blair | 119/51.11 |
| 3,678,902 | 7/1972 | Ruth | 119/51.11 |
| 3,920,224 | 11/1975 | Fassauer | 119/51.11 X |
| 4,069,793 | 1/1978 | Gower | 119/51.13 |
| 4,256,058 | 3/1981 | Deakins | 119/51.11 |
| 4,437,595 | 3/1984 | Stevens et al. | 119/51.11 X |
| 4,688,520 | 8/1987 | Parks | 119/51.11 |
| 4,733,634 | 3/1988 | Hooser | 119/51.12 |
| 4,735,171 | 4/1988 | Essex | 119/51.12 |
| 5,299,529 | 4/1994 | Ramirez | 119/51.11 |
| 5,483,923 | 1/1996 | Sabbara | 119/51.11 |
| 5,555,842 | 9/1996 | Chocola et al. | 119/51.11 |

*Primary Examiner*—Robert P. Swiatek

[57] ABSTRACT

An automatic dog and cat feeder includes an elongated vertical housing enclosing a hopper in the upper portion thereof. Its lower end is the funnel outlet hole. A spring-loaded cone valve below the outlet prevents the dry pellet particular feed from being released. The cone valve movement is solenoid-operated with timers. One timer selects the time of day for feeding, the other timer the amount of feed released. This is regulated by a predetermined setting the cone valve remains open for large or small pets' needs. The feed delivery system is housed in a container which in turn when in operation directs dry pellet particular feed to the exterior of the feeder into a feed dish.

7 Claims, 6 Drawing Sheets

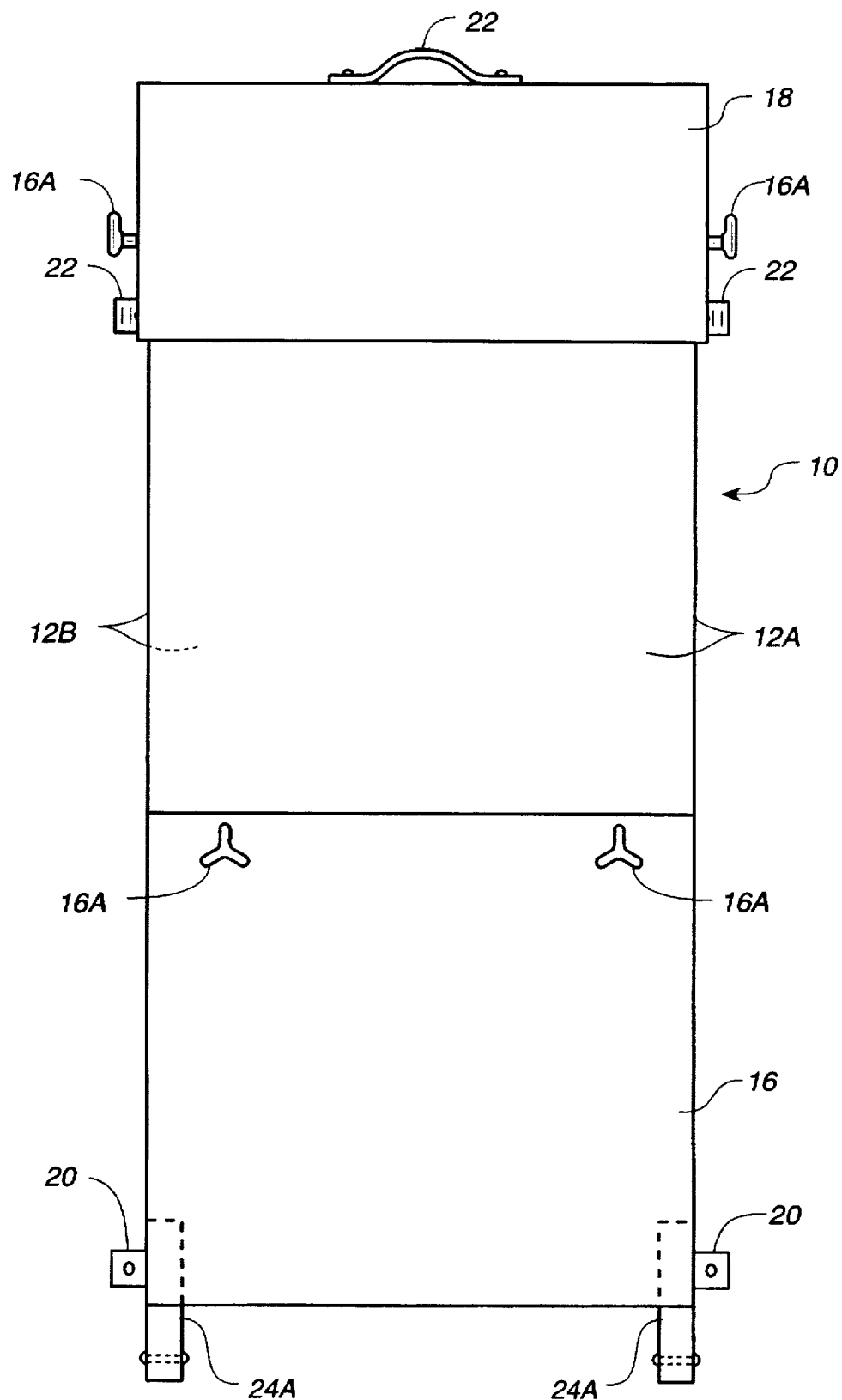
FIG._1

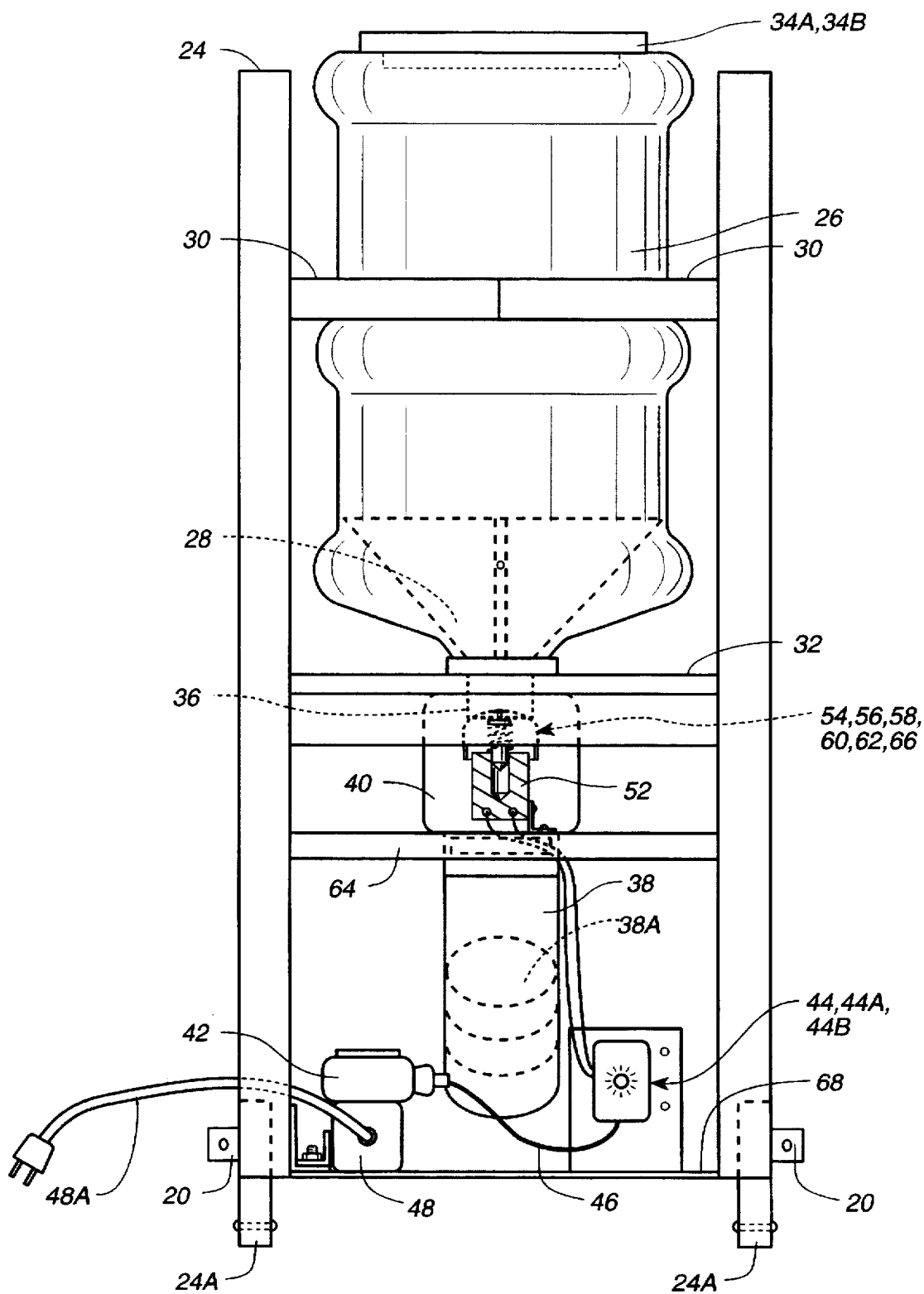
FIG._2

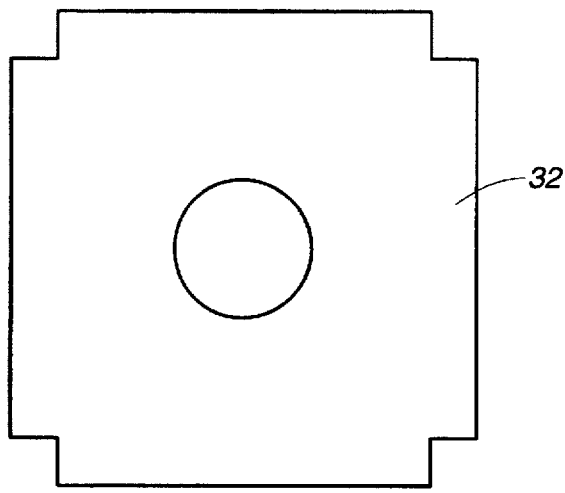
FIG._3
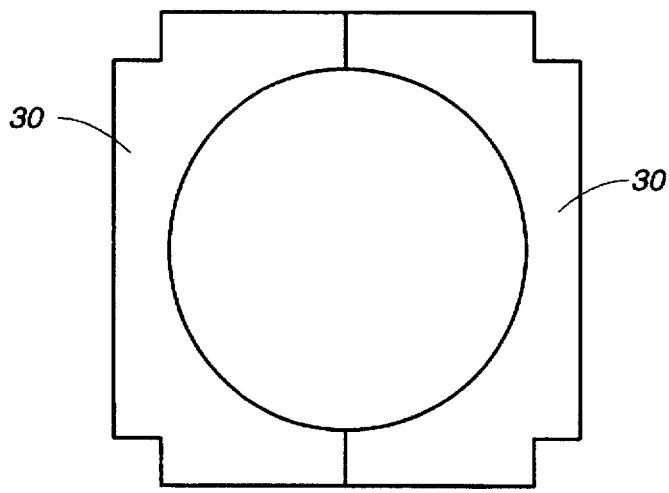
FIG._4
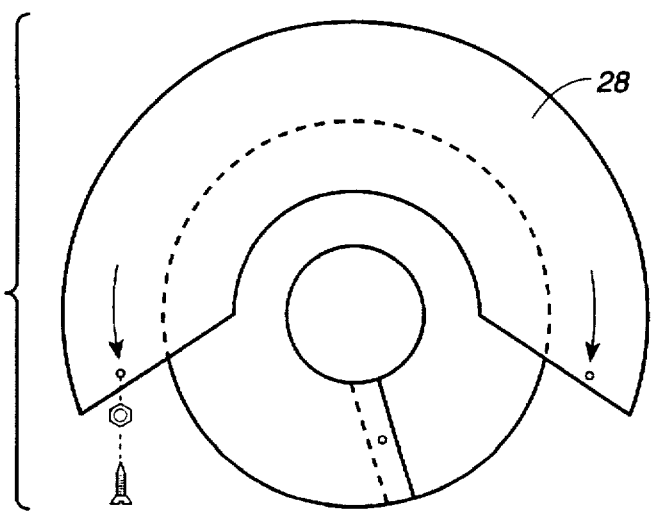
FIG._5

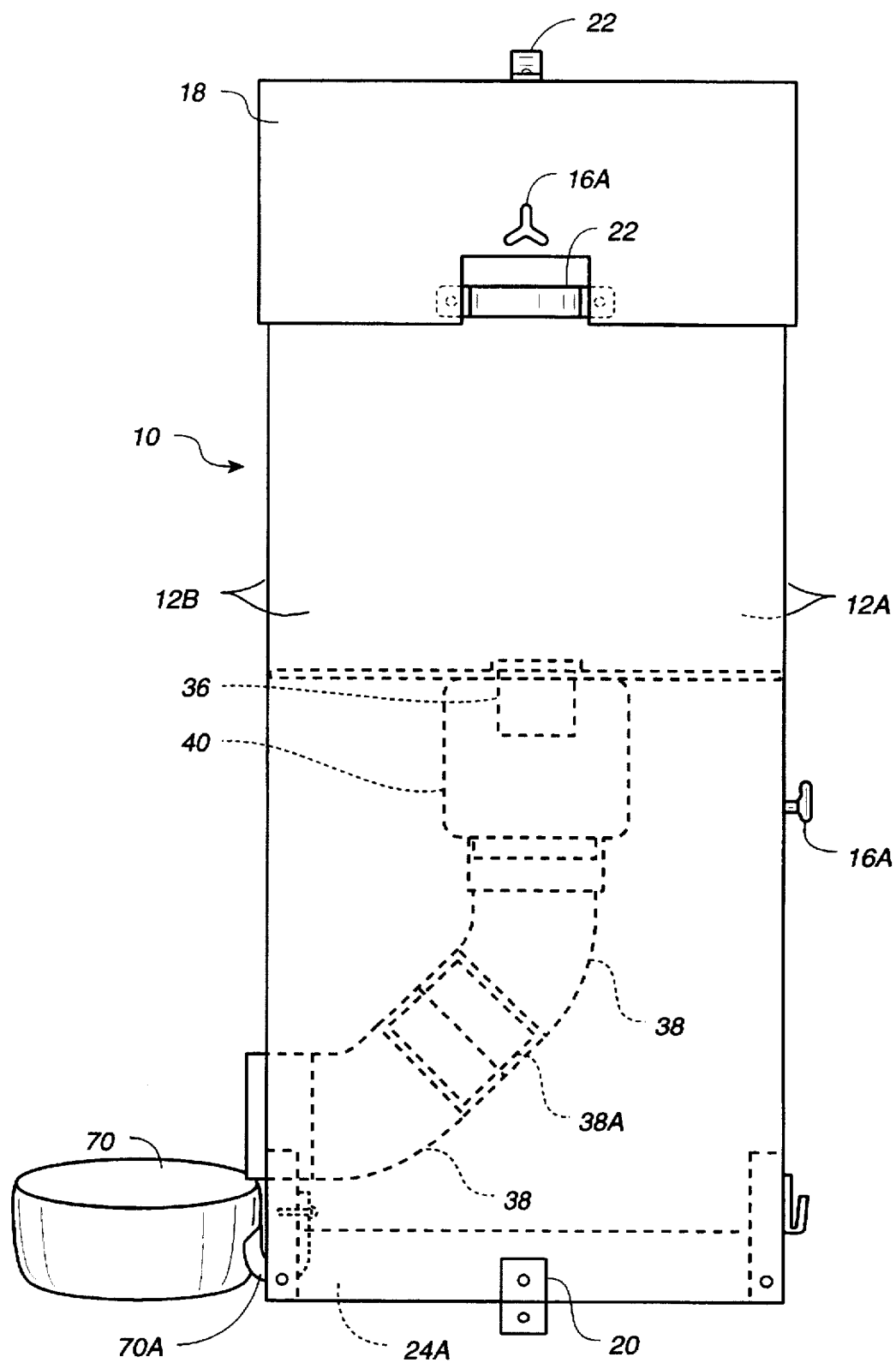
FIG._6

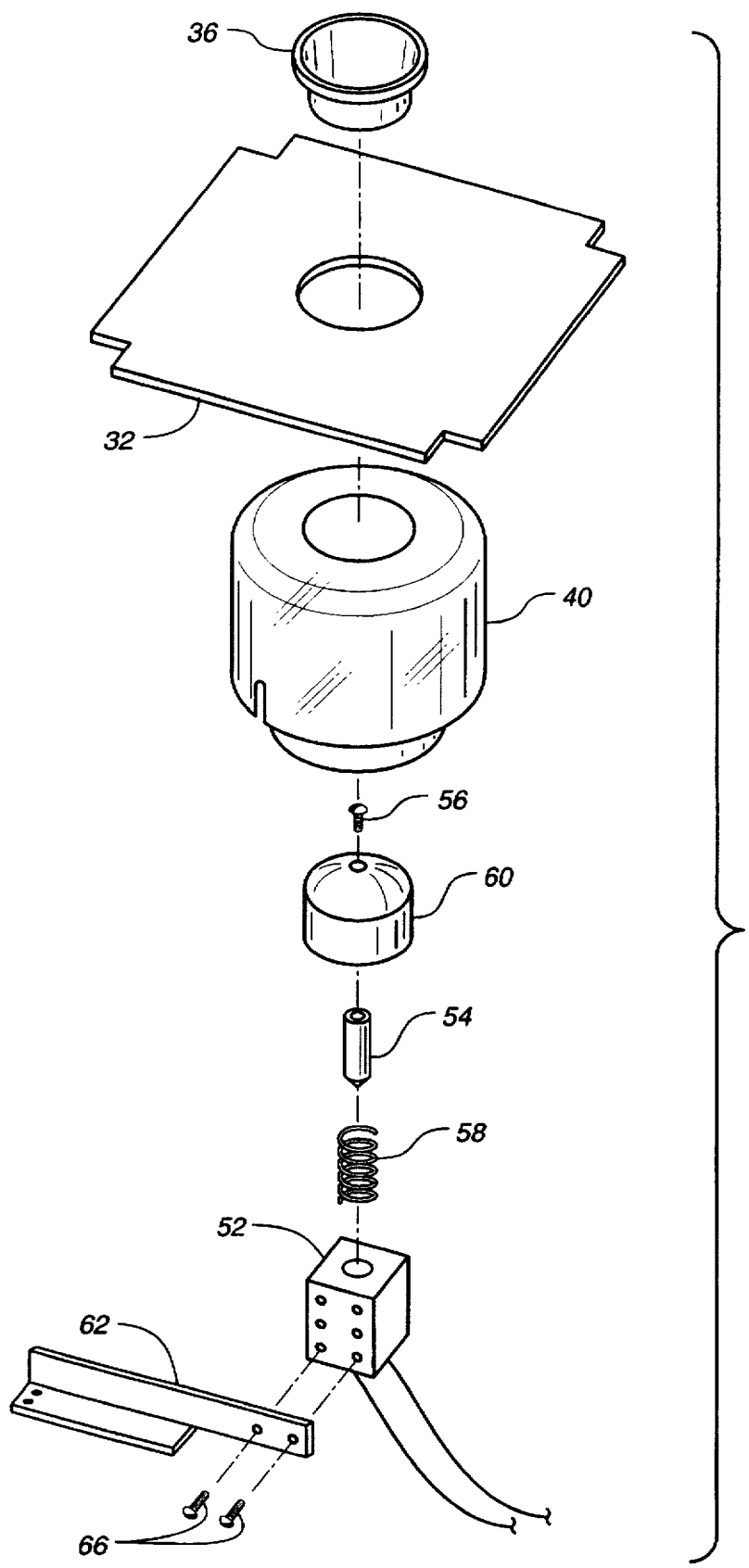
FIG._7

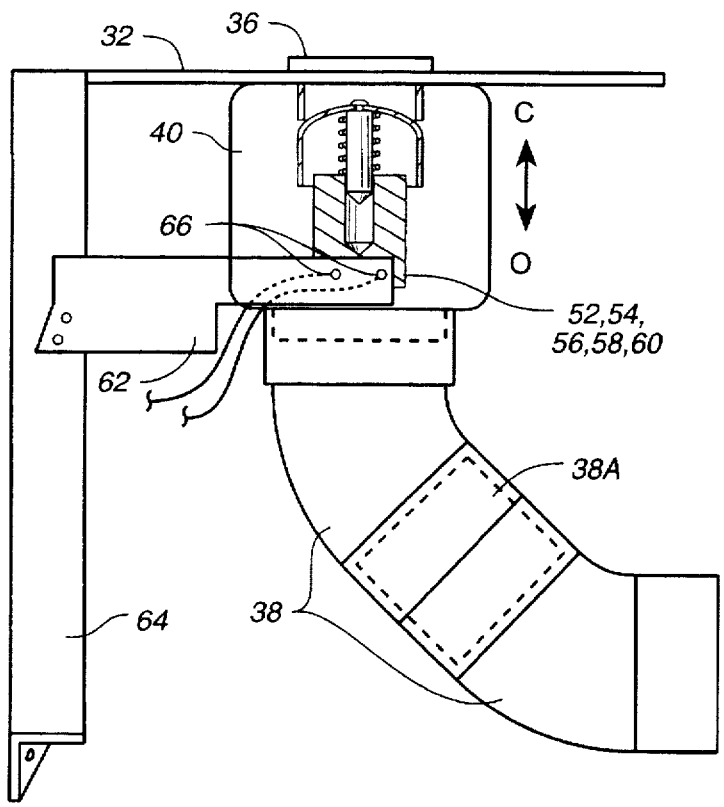
FIG._7A
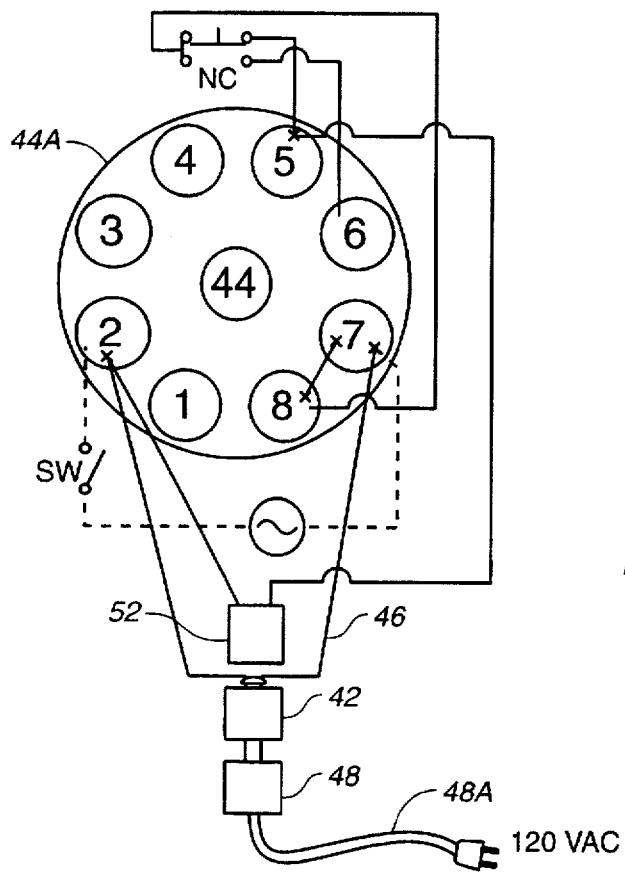
FIG._8

5,794,560

1

AUTOMATIC DOG AND CAT FEEDER

BACKGROUND

FIELD OF THE INVENTION

Cross-Reference To Related Application: This Application is related to application Ser. Nr. 08/699,550, Filed Aug. 19, 1996.

This invention relates to an automatic dog and cat feeder. Specifically, to an improved feed delivery system for feeders.

BACKGROUND DISCUSSION OF PRIOR ART

After about two years of trying to purchase a pet feeder, I wasn't able to find a suitable product. After building some different feeders, I believe there is a market need.

This brings me into the prior art category of animal feeders. I have reviewed hundreds of patents and prior arts and I cannot understand why only a few feeders are available in pet stores. These were indoor use plastic manual feed and one 120 vac operated about 5 feed portions rotary type plastic feeder. A few of the prior art feeders I may have purchased if available in pet stores. Almost all the prior art feeders were not suitably constructed for consumers. Probably because they would be expensive and mechanically complicated to operate reliably. For example, all the feeders incorporated in various forms motors, gears, reducers, pullys, belts, augers, switchs, buckets, solenoids, mechanically operated doors and trays, photo cell activated timers, batteries, computers, lights, even a voice recording.

I could list many other disadvantages of prior art but I think the point has been made. Some feeders were for animal husbandry farm or commercial application that utilize some items I mentioned but not for pet owners' requirements of a simple, reliable, affordable or maybe seldom used feeder. Another problem I have with prior art feeders is the disadvantages of feeders combining feed and water in animal feeders. Pet owners have so many simple products sold in pet stores to supply water to their pets. Feeders require the use of dry particular matter feed. Water being supplied from a feeders inside cabinet will cause the feed to absorb moisture, get soggy, and prevent its delivery. Also under certain conditions, a sauna effect from sunshine and heat can produce this effect. In addition mold, algae, and humidity could be impossible to control and be a health problem for pets. Also the electrical controls used in all feeders would be subject to failure, particularly computer type feeders. Rust could damage other parts from functioning.

OBJECTS AND ADVANTAGES

The automatic dog and cat feeder gives a pet owner the opportunity to provide feed to pets when away from home. Most people ask friends, neighbors or family members to feed their pets. If a pet is accustomed to being kenneled outdoors, it is preferable to having it boarded, which is also expensive. Except for severe cold or snow areas, cats are very adaptive to outdoors, provided food is supplied. From the prior art I have described, I personally wouldn't consider buying almost all feeders mentioned, except for a couple of feeders in the prior art. Living in a large metropolitan area it's surprising that a suitable pet feeder isn't sold. An outdoor feeder is required to be strong enough to withstand abuse from pets, raccoons, skunks, and to hold and dispense multiple feed portions to the exterior of the feeder preferably. It has to be reliable mechanically with the least parts

2 to operate. This makes it also economical to produce and affordable for pet owners to purchase.

Accordingly, several objects and advantages are addressed in my invention which will become apparent from consideration of the drawings and ensuing description.

BRIEF DESCRIPTION OF THE DRAWINGS

FIG. 1 is a perspective view of the feeder;

FIG. 2 is a view of all the parts inside the feeder;

FIG. 3 is a view of the base support for the hopper and fitting;

FIG. 4 is a view of the hopper vertical side spacer supports;

FIG. 5 is a view of the template which is formed in the hopper for its lower funnel;

FIG. 6 is a view of the cabinet and pipe fittings to the exterior feed dish;

FIG. 7 is a view of the valve assembly parts;

FIG. 7A is a view of the closed/open operational position of valve and solenoid; and FIG. 8 is a schematic of the electrical circuit of invention.

SUMMARY OF THE INVENTION

The automatic dog and cat feeder includes an elongated vertical housing enclosing a hopper in the upper portion therein. Its lower end is the funnel outlet. A spring loaded cone valve prevents the dry pellet particular feed material from being released. The valve movement is solenoid operated with timers. One timer selects the time of day for feeding; the other timer the amount of feed dispensed. This is regulated by a predetermined; setting the valve remains open for large or small pet needs.

DETAILED DESCRIPTION OF THE INVENTION

The automatic dog and cat feeder as best seen in FIG. 1, part 10, includes an elongated vertical square housing of light-weight sheet metal material. The feeder to top cover 18 allows access to the hopper 26. A sheet metal door 16 provides access to the electrical controls.

As shown in FIG. 2, the frame 24 is made of square metal tubing welded together into one piece. Part 24A of the frame extension mounts to the base of the frame 24. This raises the frame 24 to the height of a large feed dish 70 to the level of the elbow 38 feed outlet. The frame extension 24A is removable and not required if a built in feed dish, as described at the end of the specification, is ever used.

As shown in FIG. 3, part 32 is the base support for a hopper 26 and a 3"×4" pipe reducer 36. The hopper 26 is a 5 gallon plastic bottle capable of providing multiple feed portions for pets of dry particular matter feed. The hopper 26 has a 7" feed hole on top and a 3" feed outlet hole on its lower end. Parts 34A and 34B are bolted together with a hole in center of each piece. These pieces provide a feed hole cover for the hopper's 7" hole. The base support 32 mounts into the frame 24 vertical supports. The base support 32 has a 3" hole in its center for the pipe reducer 36 which is next installed in the base 32 hole. The hopper 26 is then installed above and to the 4"end of the pipe reducer 36 so they accommodate each other.

As shown in FIG. 4 the hopper's 26 support spacers 30 are installed above the hopper's center diameter holding and centering it.

As shown in FIG. 5, a funnel 28 is manufactured from a flexible copper clad mica material. It is a form of template and installed in the hopper 26. It is formed in the hopper 26 and a small bolt and nut installed in pre-drilled holes keep the ends in place. It is positioned to the hopper 3" hole outlet. Several FIBERGLAS pieces of tape to the inside of hopper 26 and the funnel diameter make a good bond.

The best perspective view of parts 40, 52–66 (even numbers only) are shown in FIG. 2. The following procedures are required to install these parts. The view shows a support bracket 64 mounted horizontal to vertical parts of the frame 24. The support bracket 62 is mounted on bracket 64 in an off set T horizontal. Parts 52–60, 66 are installed inside the container 40 supported by bracket 62. The parts will be described and the interrelation best viewed in FIG. 7 and 7A drawings. Two parts need to be described. A plastic container 40 has a 3" hole on top flat side and 4 ½" outlet on lower end. Viewing FIG. 7A, bracket 62 enters a vertical slot hole in the container 40 lower side. Next, viewing FIG. 7 shows the design of bracket 62. The right side is 1" flat horizontal with 2 holes in it. The left side is 1"×1 ½" aluminum angle with 2 holes to mount on angle iron bracket 64. I will describe the parts 40, 52–66 and how the parts are assembled. A hole in the cone valve 60 is for a bolt 56 to mount 60 to the core 54 female threads. Put spring 58 over the core 54 and 54 into the solenoid 52 core hole. Using a rubber band install it over the cone valve 60 and the solenoid 52. This holds the parts 54–60 in the solenoid 52 core hole with a little tension for further assembly. To clarify the cone valve 60 is hollow, the core 54 and the spring 58 mount inside. The cone valve 60 retracts over solenoid 52 when energized. Part 62 bracket 1" flat side is installed in the container 40 vertical slot hole. Then parts 52–60 mount to the bracket 62 inside container 40 with bolts 66.

The following procedure describes how the parts are installed with bracket 64. Mount bracket 62 with parts 40, 52–60, 66 to bracket 64 top side in an off set T with a vise grip. The other flat surface of the bracket 64 will mount to the frame 24 vertical supports horizontal on the side where the control panel door 16 is. These final steps will complete the feed valve assembly. The container 40 is installed over the pipe reducer 36 outlet in the container 40 flat top 3" hole to base support 32 underside. Having two C clamps available will be needed to position and hold in correct position parts 40, 52–66 for drilling holes and mounting with bolts. The complete assembly slides up the frame 24 vertical supports. At this point adjustments will be necessary moving and clamping brackets 62 and 64 with the cone valve 60 centered under the pipe reducer 36 to its outlet closing it. If everything is placed correctly the solenoid 52 wires exit the container 40 slot hole. Drilling and installing bolts completes the feed delivery system.

As shown in FIG. 7A the two drain elbows 38 connect together with a short pipe 38A. One elbow 38 fits the container 40 lower outlet diameter. The other elbow 38 outlet centers between the vertical frame 24 supports the side opposite bracket 64. In this position a sheet metal screw holds the elbow 38 to the base 68.

The electrical controls mount in the cabinet below angle iron bracket 64 to base 68. The receptacle 48 is installed left side to the base 68. Mount bracket 44B is installed on right side of the base 68. Relay socket 44A mounts to the bracket 44b.

Referring to FIG. 8, the wiring 46 connects to the timer relay socket 44A terminals as wiring diagram shows and its plug into the timer 42. Timer 44 plugs into the relay socket 44A after completion of wiring. Timer 44 is a Agastat motor driven timer. It is a model "stpmyhaa" 120vac time 1–10 seconds. It is adjustable from 1–10 seconds of operation. For example, a setting of about 1second will supply a food portion for a cat or 2to 3seconds for a dog. It makes only one cycle and will reset itself after the timer 42 clock shuts off power to its outlet. Timer 42 is an Intermatic Time all MDSB 711C 120vac and has two on/off settings each day. For feeding outdoor pets daylight feeding is recommended because any feed will be eaten by raccoons, skunks, etc. after dark. The power cord 48A is connected through the left sheet metal side part 12B into the receptacle 48 connections. Timer 42 plugs into the receptacle 48, the outlet of the timer 42 is accessible on the right side where the wiring 46 plugs into it. Two angle iron brackets 20 mount to the base of frame 24A right and left side with bolts. The feeder can be anchored to floor or the ground with tent or garden stakes. Any feeder will not operate if it's toppled over by a pet or animal.

OPERATION OF INVENTION

With dry pellet particular feed in the hopper 26 the following procedure will operate the feeder. First set the timer 42 to time of day feeder will operate, to the closest setting on/off. Then set the timer 44 to, for example, 3 seconds for a dog. Plug in the power cord 48A and manually turn dial clockwise of the timer 42. When you reach the time set the power comes on feeding it to the timer 44 which operates for 3 seconds dispensing a feed portion to a feed dish 70. Further turning the timer 42 dial manually will shut the power off to the timer 44 resetting it for the next feed cycle. This procedure will give a pet owner the correct feed for large or small pets by adjusting timer 44. Then turning the timer 42 dial to the correct time of day will put the feeder in automatic operation. The further discussion will explain the relationship of various parts of the invention.

The solenoid valve assembly parts 52–60 mounted to bracket 62 as explained earlier in specifications, are positioned to pipe reducer 36 outlet feed hole inside the container 40. The clear plastic container 40 outlet connects to elbows 38. When the solenoid 52 is energized the cone valve 60 opens and the feed is released from the pipe reducer outlet 36 and gravity conducted by the elbows 38 from the container 40 outlet to the feed dish 70 positioned to receive feed. A spring 58 returns the cone valve 60 to the closed position. The cone valve 60 has a cone or dome shape top and the feed rolls off it in a complete radius. Also, the cone shape provides a circular barrier to the spring 58 and core 54 from the feed, as clarified before. The flat bracket 62 earlier explained allows the feed to freely fall by gravity.

In another embodiment, I have completed a separate working model which is for a cat feeder. It's the parent to the one in this application. The novelty feed delivery systems are the same for both except for several variations. This feeder is designed only for a cat and the feed is delivered into the cabinet. Whereas, the other for a dog and cat, dispenses the feed to the exterior of the cabinet. The cat feeder is ½ the size of the dog and cat feeder and utilizes each one's different capabilities. The cat feeder uses smaller feed matter which larger dog feed could bridge in the outlet preventing the feed delivery, a common problem feeders can have. Whereas, the dog and cat feeder doesn't have this problem. A large animal would require a large cabinet and have problems the cat feeder does not have. As a cat owner, I prefer the smaller cat feeder. It holds feed for over a month and, I believe, would appeal to cat owners. The control panel door has a cutout for a cat to reach in with its head and feed from a dish inside. Also, the electrical controls mount above and on the right side inside the cabinet. The door must be removed to adjust them. The only electrical difference is the time delay used which is another of many types available. It is adjustable to a 1 to 14 seconds motor driven timer and mount bracket assembly. It is a model RB 14second 115vac 5watts made by The Singer Timer Division. Parsippany, N.J., if still in business.

I will try to summarize some parts. It has a metal hopper, 2" ABS outlet, smaller cone valve, solenoid, core, spring, a threaded rod about 8" long with two 1" washers 4" apart from one end. A nut on each side of the washers hold the washers on the threaded rod. The other end of the threaded rod has a nut about 1" from the end. To hold the cone valve to the core the threaded rod end serves the purpose of a bolt. The cone valve has a center hole the threaded rod end enters and screws into the core female threads until it bottoms about ½" in the core female threads. Then the nut on the threaded rod tightens to the cone valve. The complete assembly, 1" washers, nuts, threaded rod, cone valve, core, spring and solenoid is mounted to a flat bracket for final assembly. The 1" washers, nuts, threaded rod parts above the cone valve extend vertically up into the hopper feed through the 2" ABS and also a 4" drain pipe over the 2" ABS. The cone valve closes the 2" ABS feed outlet with the core, spring, solenoid mounted to the flat bracket that mounts horizontal to each side. The 4" pipe has a 1" vertical cut on each side to install it on cross bracket. The 4" pipe contains the feed and directs it into the feed dish. The purpose of the threaded rod is to prevent feed from bridging. When the solenoid energizes, the cone valve opens releasing the feed from the hopper and 2" ABS outlet. The threaded rod with the washers help push the feed material in the hopper out the 2" ABS outlet, also with the aid of gravity. The threaded rod being very flexible and of a small diameter 8" long with the washers and nuts does react to the snap action of the solenoid energizing by vibrating the threaded rod. This helps to also prevent feed bridging and is a practical way to utilize the solenoid energizing action and the washers which also opens the 2" ABS outlet completely to dispense the feed. The cat feeder also has angle iron brackets to mount to the floor or into the ground.

CONCLUSION, RAMIFICATIONS AND SCOPE OF INVENTION

Thus, the reader will see that the automatic dog and cat feeder is simple, easy to operate, and further improvement would be possible with the manufacture of similar parts to facilitate assembly. A molded square hopper with a funnel end could be adaptable to present frame, thus, some parts could be eliminated. Only one moving part is used in this invention, a solenoid that is trouble free used in its present use. Even in its present design it is economical to produce and is affordable for pet owners. In a kit form it would not be difficult to assemble. The feeder has very few parts, mostly off- the shelf- items familiar to most people.

While my description contains many specifications these should not be construed as limitations on the scope of the invention, but, rather as an exemplification of one preferred embodiment thereof. Other variations are possible. For example, if only one elbow 38 was removed, a molded plastic or sheet metal type feed dish piece could be substituted. It would extend into the cabinet and a 4" hole in it would fit the other elbow 38 and rest on the base. The piece would have a 1" four sided edge to attach with sheet metal screws to the frame. The dish part extends out 2"-3" with a ¼" hole to drain any water if used outdoors. The one piece would provide a feed dish and keep cabinet area separate from the exterior. Then the frame extension 24a, feed dish 70 and 70a dish holder parts would not be needed.

A very inexpensive vinyl cover could be made available to provide protection if used outdoors. Prior art does not address this issue for pet feeders used outdoors. Even a heavy duty garbage bag could be used. It would extend over the feeder leaving the dish area open.

This invention has been described with references to its illustrated preferred embodiment. Persons skilled in the art of constructing feeding apparatus may upon exposure to the teaching herein conceive variations in the mechanical development of the components therein. Such variations are deemed to be encompassed by the disclosure, the invention being limited only by the appended claims.

I claim:

1. An automatic dog and cat feeder comprising:
   a. a housing consisting of access holes;
   b. a frame;
   c. a base support with a center hole on said frame;
   d. a hopper with a top inlet hole for receiving feed and an outlet hole on its lower portion;
   e. a funnel template installed in said hopper and located in the lower portion therein;
   f. a cover for the hopper inlet hole;
   g. a pipe reducer with an outlet hole installed in said base support center hole and the hopper accommodated above it;
   h. a plastic container with a hole on an upper flat end installed over the said pipe reducer outlet hole and said plastic container having a vertical slot hole on its lower side and an outlet hole on its lower end;
   i. a cone valve positioned inside the plastic container in contact with the pipe reducer closing its outlet and capable of reciprocating;
   j. a hub to hub elbow connected to the plastic container outlet to conduct said feed to the said housing exterior;
   k. a feed dish positioned to receive the feed and an automatic control means to operate said cone valve at predetermined time periods to control amount of feed delivered to said feed dish.

2. An automatic dog and cat feeder as set forth in claim 1 further including a solenoid core compression spring connected to the cone valve and having the ability to reciprocate.

3. An automatic dog and cat feeder as set forth in claim 2 further including a support bracket, one end being a right angle mounted to the frame and the other end being flat, said support bracket being installed in the plastic container vertical slot hole with the said solenoid core compression spring cone valve mounted to the said support bracket flat end and in contact with the pipe reducer outlet, the cone valve closing the hole outlet and having the ability to reciprocate in the plastic container.

4. An automatic dog and cat feeder as set forth in claim 2 wherein said automatic control means comprises a first timer which is operable to control when the solenoid core compression spring connected to the cone valve and having the ability to reciprocate initiates the delivery of feed to the feed dish and a second timer which is operable to control the duration the solenoid delivers the feed to the feed dish after the feed delivery is first initiated by said first timer.

5. An automatic dog and cat feeder as set forth in claim 1 further including a support for the hopper fastened to the frame.

6. An automatic dog and cat feeder as set forth in claim 1 further including a sheet metal cover for the said housing access holes to provide the feed to the hopper and a sheet metal door for the housing access holes to the first timer and the said second timer.

7. An automatic dog and cat feeder as set forth in claim 1 further including an angle iron bracket fastened to the frame at the floor level with holes provided in said angle iron bracket to also anchor to a concrete floor or the ground.

* * * * *